United States Patent [19]

Barth

[11] Patent Number: 4,494,967
[45] Date of Patent: Jan. 22, 1985

[54] PROCESS FOR THE REMOVAL OF IMPURITIES FROM A GAS STREAM CONTAINING SOLVENT VAPORS

[75] Inventor: Peter Barth, Neuwied, Fed. Rep. of Germany

[73] Assignee: Lohmann GmbH & Co. KG, Neuwied, Fed. Rep. of Germany

[21] Appl. No.: 502,018

[22] PCT Filed: Aug. 13, 1982

[86] PCT No.: PCT/EP82/00171

§ 371 Date: Apr. 14, 1983

§ 102(e) Date: Apr. 14, 1983

[87] PCT Pub. No.: WO83/00641

PCT Pub. Date: Mar. 3, 1983

[30] Foreign Application Priority Data

Aug. 14, 1981 [DE] Fed. Rep. of Germany ....... 3132292

[51] Int. Cl.³ .................. B01D 53/04; B01D 47/05
[52] U.S. Cl. .......................... 55/74; 55/80; 55/85; 55/89; 55/228
[58] Field of Search ............ 55/62, 73, 80, 84, 85, 55/89, 228, 74

[56] References Cited

U.S. PATENT DOCUMENTS

| | | | |
|---|---|---|---|
| 3,324,669 | 6/1967 | Cooper et al. | 55/62 |
| 3,343,916 | 9/1967 | Cahn et al. | 55/62 |
| 3,618,301 | 11/1971 | Handman | 55/89 |
| 4,227,891 | 10/1980 | Maguire et al. | 55/85 |
| 4,265,642 | 5/1981 | Mir et al. | 55/85 |
| 4,287,138 | 9/1981 | Buckner | 55/89 X |

FOREIGN PATENT DOCUMENTS

| | | | |
|---|---|---|---|
| 0232716 | 2/1961 | Australia | 55/80 |
| 2511181 | 9/1976 | Fed. Rep. of Germany | |
| 2224215 | 10/1974 | France | |
| 139488 | 7/1921 | United Kingdom | |
| 2057912 | 4/1981 | United Kingdom | |

Primary Examiner—Charles Hart
Attorney, Agent, or Firm—Webb, Burden, Robinson & Webb

[57] ABSTRACT

Solid and liquid, especially high-boiling, impurities are removed from a gas stream containing solvent vapors in such a manner that the gas stream is washed with the condensate of one or more solvent vapors contained in the gas stream, preferably with the fraction which has the greatest affinity for the impurities to be removed. After a distillatory separation of the impurities, as befits the goals of the process, the solvent or solvent mixture used for the washing process is returned again into the process, preferably after it has been removed from the gas stream by condensation and/or adsorption. The gas stream can be returned into a vaporization chamber where it is again charged with solvent vapors.

4 Claims, 1 Drawing Figure

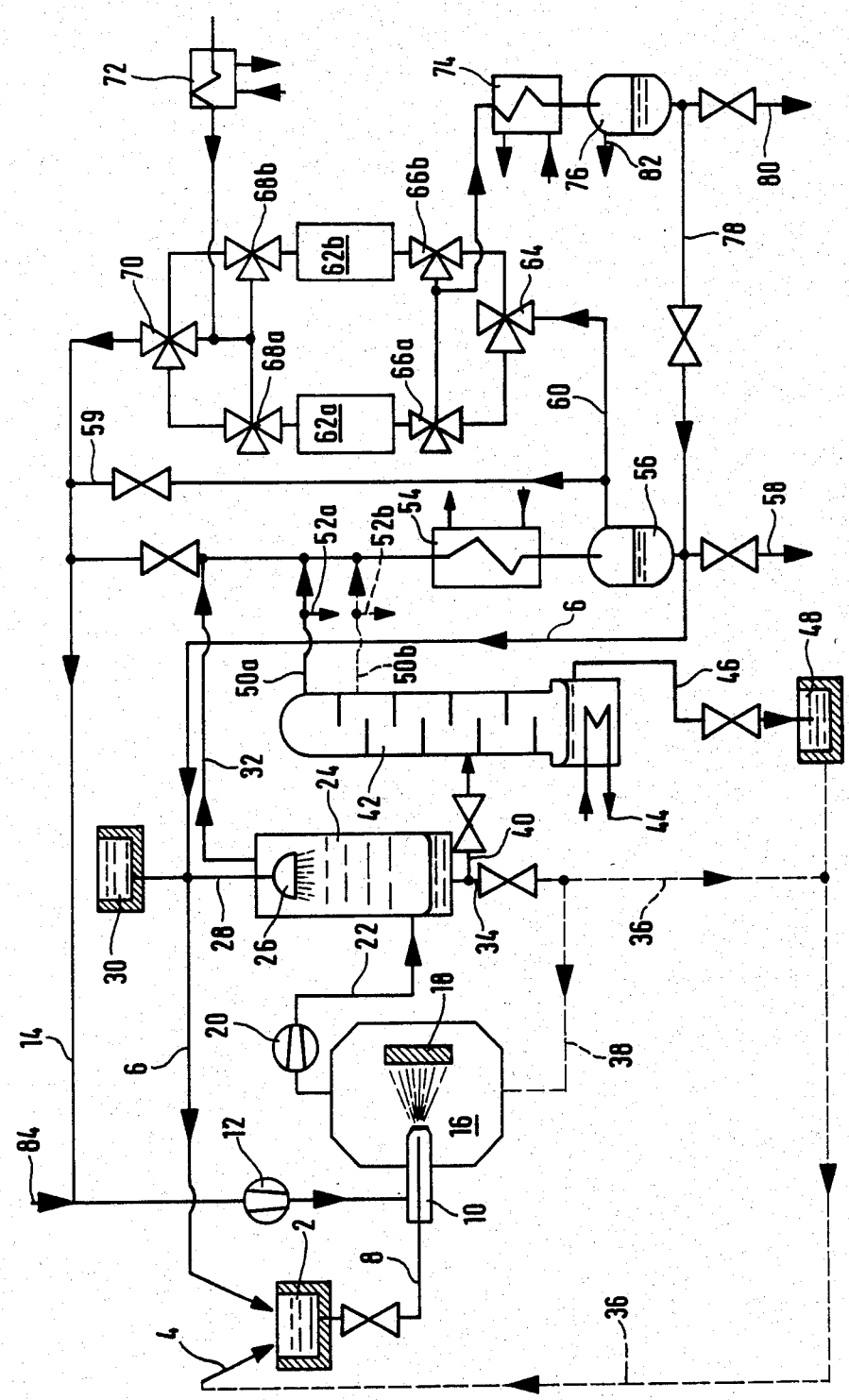

PROCESS FOR THE REMOVAL OF IMPURITIES FROM A GAS STREAM CONTAINING SOLVENT VAPORS

Because of legal requirements and/or economic reasons the solvents, with the exception of water, that are liberated during production and operational processes must be recovered. Such production and operational processes include chemical reactions, e.g. polymerization reactions, precipitation reactions, thermal decomposition reactions and similar reactions; examples of operational processes include the coating, soaking or spraying of arbitrary objects with solutions. If the solvent is removed by evaporation in a warm or hot stream of transferal gas, even the solvent constituents which are nonvolatile or difficult to volatize find their way into the gas stream as impurities. This danger occurs especially during spray-drying of solutions or during spraying of objects with solutions for coating or soaking, e.g. in painting technology.

Such contaminations can involve solid and liquid, especially high-boiling, substances, e.g. polymeric paint- and lacquer-particles, residual monomers derived from polymerides, catalytic substances, pigments, dust particles, products of thermal decomposition, such as tarry or resinous products or combustion products as well as caustic or corrosive substances.

In order that these substances not be drawn into the condensation or absorption part of a solvent recovery mechanism and there lead to fouling or contamination of the recovered solvent or the solvent mixture, the gas stream bearing the solvent vapors as well as the impurities must first be cleaned.

For the removal of impurities in the form of solid or liquid particles in suspension, mechanical mechanisms are known, such as, for example, cyclones or filters, for whose operation a relatively large amount of energy must be expended with respect to the cleaning effect. Similar considerations are true of electrostatic filters.

It is further known that very fine dust which can no longer be picked up in a centrifugal separator due to the small diameter of the particles can be separated if water is injected into the centrifugal separator (compare, for example, Ullman's *Enzyklopädie der Technischen Chemie* [*Encyclopedia of Technical Chemistry*], Volume 1 (1951), Page 374). By means of such a washing apparatus the finest dust particles are bound to the washing liquid which is removed from the air stream by baffle cleaners.

The separation of the suspended particles by means of water-washing, however, has the disadvantage for a gas stream bearing solvent vapors that the water absorbs the vapors of solvents which are miscible with water and that the solvents are thereby lost or can only be recovered at great cost, since they generally are contained in the wash water only in a small concentration. Moreover, with solvent mixtures the hydrophobic solvent components are not washed out of the vapor mixture while simultaneously a part of the wash water changes to the vapor state. During the subsequent condensation one finds a two-phase mixture whose hydrophobic component is frequently emulsified in the aqueous phase so that the phase separation is made more difficult. As a result of the washing out of the hydrophilic solvent component the composition of the hydrophobic solvent component no longer corresponds to the original composition and consequently the solvent can no longer be directly reintroduced into the process but rather must be enriched with a fresh, hydrophilic solvent component.

Finally, the washed out particles in suspension involve in many cases reusable substances, e.g. lacquer or paint particles. If these particles are present in an aqueous suspension, a preparation is extremely difficult.

The invention is based on the requirement of eliminating the disadvantages inherent in the known water-washing operations and of providing a method as well as a mechanism for removing the impurities from a gas stream containing solvent vapors for which purpose, on the one hand, the impurities are efficaciously removed and, on the other hand, a solvent or solvent mixture, which can be reused with as little additional cost as possible, is obtained from the gas stream.

This requirement is satisfied by the invention in that the gas stream, in order to remove the impurities contained therein, is washed with the condensate of one or more solvent vapors contained in the gas stream.

Preferably one washes the gas stream with a solvent condensate fraction which has the greatest affinity for the impurities to be removed. In this way not only is the washing effect improved but also the impurities are produced in a form in which they can be reintroduced again into the process without special preparation, assuming reusable substances are involved. For example, resinous particles have a great affinity for hydrophobic solvents by which means a directly reusable, soluble resin is obtained during washing. Generally speaking, polar substances are preferentially washed out by polar solvents and nonpolar substances are preferentially washed out by nonpolar solvents.

Solid and liquid particles in suspension as well as constituents whose dew point is above the temperature of the solvent or the solvent mixture used for the washing are separated from the gas stream by the solvent.

Preferably one performs the washing at a temperature of which an equilibrium is established between the parts of the solvent mixture which condense during the washing and the parts which vaporize. This leads to the result that the quantity of the solvent present in the washing process neither decreases nor increases in the equilibrium. After the washing process the gas stream contains the desired solvent or solvent mixture at a high purity level or at a desired mixture ratio so that the recovered product can be reintroduced into the process without special preparation.

One can also add to the solvent or solvent mixture used for the washing auxiliary agents which bind chemically and/or physically to the impurities to be removed from the gas stream. This possibility involves primarily disruptive impurities, e.g. corrosive decomposition products. Thus, for example, acids can be eliminated by adding alkaline substances to the solvent or solvent solution. Even the reverse method is conceivable, i.e. one can add acids to the solvent or solvent solution in order to remove the alkaline impurities. Auxiliary agents which physically bind the impurities to be removed are, for example, adsorption agents that can be added to the solvent or the solvent mixture for removing disruptive, odorous substances. The auxiliary agents can also serve to intensify the physical affinity of the solvent or solvent mixture in order to promote thereby the complete elimination of the impurities.

Supplementary solvents are examples of such auxiliary agents which have a stronger affinity for the impurities to be removed than do the actual washing solutions. Included in these, for example, are nonpolar solutions which can be added to a mixture of polar washing solutions to provide better removal of tar particles.

One can reintroduce into the process the solution or solution mixture used for the washing either together with the removed impurities or after the elimination of the impurities. The first case involves reusable impurities, e.g. particles of resin or polymers; in general, the second case involves impurities which are not reusable or whose reuse is limited, e.g. decomposition products, corrosive substances or other environmentally dangerous substances. After the separation of the solvent these substances can be, for example, burned or changed into other useful substances.

The separation of the impurities can be achieved by filtration or by centrifugal extraction if the impurities involved are insoluble in the solvent or if they, along with the auxiliary agents which, when necessary, are used, have formed insoluble reaction products or adsorption complexes. The used solvent or solvent mixture is then returned in fluid form in the process or used as washing solution.

Frequently, however, the separation of the impurities is achieved through distillation or fractionation during which the solution is produced in its vapor phase and can first be fed to the gas stream from which it then can be recovered by condensation and/or adsorption along with, where necessary, the solution vapors originally contained and the parts which vaporize during the washing.

In many cases one condensation is sufficient, especially if one returns the gas stream, whose level of solvent vapors is low, to the process for renewed loading with solvent vapors. Frequently, though, an adsorption is added after the condensation, especially if the gas stream is vented to the atmosphere or if it is a question of returning to the process a gas stream which has been extensively purged of solvent vapors and also, when necessary, of disruptive impurities (e.g. volatile, odorous substances).

The return of the gas stream is particularly appropriate if the gas stream in an inert gas. The use of inert gases is recommended for combustible or explosive solutions. The preferred inert gas is nitrogen. In addition, noble gases, carbon dioxide, as well as combustion exhaust gases with a decreased oxygen content can be used.

The subject matter of the invention, moreover, is an apparatus for performing the above-described process which is characterized by the following features: A washing mechanism which is equipped with feed pipes for a gas stream laden with impurities and containing solvent vapors and for a solvent condensate which is at least partially recovered from the solvent vapors as well as with offtake pipes for the gas stream purged of the impurities and for the contaminated solvent or solvent mixture; a separation mechanism installed after the washing mechanism for separating the contaminated solvent or solvent mixture into a fraction containing the impurities and into a fraction containing the solvent in liquid or gaseous form; and a condensation and/or adsorption mechanism installed after the washing or separation mechanism for extracting a solvent condensate from the gas stream.

The separation mechanism can be, for example, a filter mechanism or a centrifugal mechanism if the impurities are insoluble in the solvent. In this case, the washing solvent can be returned to the process without further preparation or used again as a washing fluid so that the condensation and/or adsorption mechanism for condensing or adsorbing the solvent vapors from the washing mechanism can be installed directly behind the latter.

Frequently, however, the separation device is a distillation-separation mechanism in which the contaminated solvent or solvent mixture can be separated into a bottom fraction containing the impurities and into one or more top fractions containing the solvent vapors. The gaseous top fraction(s) will then be fed into the condensation and/or adsorption mechanism which is installed after the separation device.

In light of the considerations described above, the adsorption mechanism is preferably connected on the outlet side of the condensation mechanism. One or both of these mechanisms have, connected to a vaporization chamber for recharging the gas stream with solvent vapors, an offtake pipe for the gas stream which has a low level of solvent vapors or which has been purged of them. The vaporization chamber can be a compartment in which an object is coated, soaked, or sprayed with a processing solution at which time the solvent or solvent mixture is vaporized. The object to be processed can, however, be coated, soaked, or sprayed with the processing solution outside of the vaporization chamber and subsequently brought into the vaporization chamber for the vaporization of the solvent or solvent mixture. For faster vaporization of the solution, the object to be processed preferably is heated. A conveyor drying machine on which the objects to be dried can be moved and, for example, heated by radiant heaters can also be located in the vaporization chamber. The vaporization chamber does not have to be enclosed on all sides, i.e. the treatment and the drying can also take place, for example, under an exhaust flue if air is used as a carrier gas.

An unqualified explanation of an apparatus as defined by the invention follows with the aid of the drawing.

In a mixing vessel 2 a substance which subsequently appears as contamination in the gas stream (from conduit 4) is mixed with and dissolved in the solvent or solvent mixture coming out of conduit 6. The substance is, for example, a film-forming plastic or an adhesive which is soluble in organic solvents. The solution of the substance flows through conduit 8 to an atomizer nozzle 10 where it is atomized in the vaporization chamber 16, with the aid of the gas stream from conduit 14 which has been compressed by the compressor 12, and sprayed onto an object 18. In the preferably heated vaporization chamber 16 the solvent or solvent mixture vaporizes. Simultaneously there is formed a cloud of suspended particles of plastic or adhesive which must be removed from the gas stream containing the solvent vapors. For this purpose the gas stream is drawn through the suction fan 20 and feed pipe 22 into the washing mechanism 24. The latter can be a packed washing tower to which a solvent condensate that has been at least partially extracted from the solvent vapors is supplied from conduit 6 through the shower 26 and feed pipe 28. A part of the solvent is supplied as fresh solvent from the supply container 30 in order to compensate for the solvent losses or to vary as desired the composition of the solvent mixture. Heating or cooling devices can also be provided, as required, in feed pipe 28 in order to adjust the temperature of the solvent fed to the shower 26 such that the desired equilibrium is established between the parts of the solvent mixture which vaporize and condense during the washing. The temperature control can also be provided either by cooling or warming the washing mechanism or the gas stream.

Auxiliary agents (e.g. acids, bases, or adsorption agents) can also be added to the solvent or solvent mixture used for the washing. These agents are appropriately added to the fresh solvent in the supply container 30 but they can also be fed into the washing mechanism 24 at another, arbitrary point.

The washing mechanism 24 is equipped with offtake pipe 32 for the gas stream purged of the impurities and with offtake pipe 34 for the solvent or solvent mixture laden with the impurities. If this solution (e.g. a resinous or adhesive solution) can be directly reused, it can be fed through the conduit, shown as a broken line, back into the mixing vessel 2 where it can be reconcentrated by the addition of new plastic or adhesive. Moreover, the solution can be returned through conduit 38, represented by a broken line, into the vaporization chamber where the solvent or solvent mixture is vaporized. The impurities that are left behind as a residue of the vaporization can be burned if they do not represent reusable substances.

However, if a separation is to take place, the solution is fed through feed pipe 40 into the separation device 42. The separation device can be, for example, a filtration or a centrifugal separation device if the impurities are not soluble in the solvent or the solvent mixture.

In the layout shown as an example, the separation device 42 is a distillation-separation device, i.e. a fractionating column in which the contaminated solvent or solvent mixture can be separated into a bottom fraction containing the impurities and one or several top fractions containing the solvent vapors. The fractionating column can be heated by a heating coil 44 and includes offtake pipe 46 which leads to a reservoir 48 from which the bottom fraction can be fed either through conduit 36 into the mixing vessel 2 or through conduit 38 into the vaporization chamber 16, depending on whether the separated impurities can be reused or not.

The top fraction containing the solvent vapors can be fed through conduit 50a into offtake pipe 32 from the washing mechanism. If desired, a part of the top fraction can be drawn off through conduit 52a, represented by a broken line, by which means the composition of the solvent vapors in offtake pipe 32 can be varied. Moreover, several top fractions can be drawn off out of the separation device 42 (through conduit 50b, represented by a broken line) for which offtake pipe 52b can be used in conjunction with offtake pipe 52a to vary the ratio of the individual solvent vapor fractions which are fed into conduit 32.

From conduit 32 the gas stream with the originally contained solvent vapors, the parts which vaporize during the washing process in the washing mechanism 24, and the top fraction(s) from the conduits 50a and 50b passes into cooler 54 where, depending upon the temperature of the cooling medium, the greatest part of the solvent vapors condense out. The solvent condensate is collected in the separating vessel 56 and can either be fed through conduit 6 to the mixing vessel 2, to the supply container 30, or directly through feed pipe 28 into the washing mechanism 24. By regulating the temperature in cooler 54 it is possible to further control the temperature of the solvent which enters the washing mechanism 24. The solvent condensate can be drawn off through conduit 58 if the equipment is to be taken out of service or if the solvent is to be changed.

If a fractionating column is not used and if the concentration of the solvent vapor in the gas stream in the conduit 32 is relatively low, then the condensation apparatus consisting of cooler 54 and the solvent separator 56 can be eliminated. In this case the gas stream laden with the solvent vapors is returned directly to conduit 14 from conduit 32 through conduit 59.

On the other hand, if the condensation of the solvent vapor in cooler 54 is insufficient or if the gas stream contains uncondensable impurities (e.g. odorous substances), then it is appropriate to perform another adsorption. For this purpose the gas stream is fed through conduit 60 into the adsorption apparatus, consisting of adsorbing devices 62a and 62b, and in particular across valves 64, 66a, 68a, and 70 through adsorbing device 62a, while the contents of adsorbing device 62b that was charged with solvent during a previous operational phase are being desorbed. For this purpose, a gas which has been heated in the heat exchanger 72 is fed across valve 68b through adsorbing device 62b. The gas containing the desorbed solvent vapor passes across valve 66b into cooler 74 where the solvent vapors condense out. The solvent condensate collects in solvent separator 76 and can either (through conduit 78) join with the solvent condensate from the solvent separating tank 56 or (through conduit 80) be drawn off. The desorption gas is removed through the conduit 82, or it can be circulated if it is an inert gas.

The gas passing out of adsorbing device 62a into conduit 14 is virtually free of solvent vapors and can be used as an atomizing gas in the atomizing nozzle 10. To compensate for inert gas losses, fresh gas can be supplied through conduit 84.

When the capacity of adsorbing device 62a is exhausted, adsorber 62b is switched to adsorption during which process the gas stream laden with solvent vapors passes from conduit 60 through valves 64 and 66b, is purged of solvent vapors in adsorber 62b, and passes through valves 68b and 70 into conduit 14. Simultaneously adsorber 62a is switched to desorption during which process the heated gas stream passes over valves 68a and 66a into cooler 74 where the solvent vapors desorbed in adsorber 62a are condensed out.

In the following examples some possibilities of applying the process as defined by the invention are presented in an unqualified manner.

EXAMPLE 1

For finishing the surface of tanned hides, the latter are sprayed in a vaporization chamber similar to chamber 16 with a solution which contains a film-forming polymer and inorganic pigments in a mixture of organic solvents (cyclohexanone, toluene, methyl ethyl ketone, acetone). The gas stream which is drawn out of the vaporization chamber contains solvent vapors, pigment articles, and spherical polymer particles. The gas stream is washed with acetone in the washing mechanism 24. The solvent mixture recovered from the gas stream by condensation is free of pigments and polymers and contains the originally used solvent mixture in a virtually unchanged proportion.

The concentrate of pigment and polymers which is produced in the washing mechanism 24 during the washing process constitutes about 15% of the solids introduced into the spraying operation. At the one end of the production shift the temperature of the washing mechanism is raised enough that the viscosity of the washing fluid is increased by the additional vaporization of the solvent to the viscosity range of the originally sprayed product. The concentrate can be added without further preparation to the next spray charges.

In accordance with this example, therefore, no distillatory separation of the impurities from the solvent mixture was performed in a separate separation device.

EXAMPLE 2

The gas stream taken from a vaporization chamber (in this case a dryer) contains methanol with 4 to 6% phenolic impurities which are used as monomers in the basic coating process. Methanol with a content of 0.5 to 5% potassium hydroxide is used as a washing solution in the washing mechanism 24. Through the formation of potassium phenolates in the washing solution the phenol content in the gas stream decreases to less than 0.1% so that the methanol recovered from it can be returned to the production process without further distillatory separation or any other intermediary processing.

For complete separation of the potassium phenolates from the methanol a fleecy material (felt) is soaked at the end of the production process with the solution drawn out of the washing mechanism and is returned to the vaporization chamber. There the methanol which serves as a solvent vaporizes, passes into the gas stream, and is recovered through condensation. The fleece carrying the potassium phenolates is rendered environmentally harmless through incineration.

EXAMPLE 3

During the coating of surface materials with a solution of polyacrylates, the gas escaping from the vaporization chamber (in this case a dryer) contains besides benzine (boiling point, 65° to 95° C.) about 3% by weight (related to the introduced polymer) of the vaporized monomer 2-ethylhexyl acrylate. The latter is so thoroughly removed in the benzine-coated washing mechanism due to its higher boiling point that only traces of it can still be detected in the solvent which is recovered through condensation.

EXAMPLE 4

The coating of paper as a base material with solutions of organic polymers (as adhesives) and the subsequent drying in a vaporization chamber results in an exhaust gas stream which contains, along with acetone and benzine, water which is drawn from the paper.

If this exhaust gas stream is washed in the washing mechanism 24 with an aqueous washing stage, then acetone and water are almost completely removed from the gaseous plate so that the benzine which condensed in the condensation apparatus (54, 56) can be reused without further purification. The washing fluid which discharges from the washing mechanism 24 is prepared by distillation in the column 42 during which the water, as the bottom fraction, is drawn off and discarded while acetone, as the top fraction, is extracted and added to the benzine after condensation so that essentially the original solvent mixture can be recovered.

The process as defined by the invention results in considerable cost savings with respect to energy, material costs, and waste disposal expense. Through the choice of an appropriate solvent, present in a given operational process, as a washing fluid, the purity of the recovered solvent or solvent mixture is assured or so much improved that in numerous cases it is possible to return the solvent directly into the production process without intermediary preparation. The components which are separated out during the washing process can either be returned into the production process or can be so controlled with respect to their volume or their consistency that economical disposal or repreparation is possible.

I claim:

1. A process for removing impurities from a gas stream containing one or more solvent vapors, said impurities being suspended in a gas stream as liquid or solid particles, comprising the steps of washing the gas stream with a condensate of one or more solvent vapors contained in the gas stream, said condensate being substantially free of impurities and including one or more auxiliary agents which bind the impurities to be removed from the gas stream, feeding the solvent concentrate to the gas stream after separation of the impurities and removing said concentrate from the gas stream through condensation and adsorption together with the originally contained solvent vapors and the parts which vaporize during the washing step and returning the solvent concentrate to a mixing vessel either together with the removed impurities or after separation of the impurities.

2. The process as defined in claim 1, wherein the adsorption takes place after the condensation.

3. The process as defined in claim 2, wherein the gas stream which has a low concentration of solvent vapors is returned to a vaporization chamber for renewed charging with solvent vapors.

4. The process as defined in claim 3, wherein the gas stream returned to the vaporization chamber has been purged of solvent vapors.

* * * * *

UNITED STATES PATENT AND TRADEMARK OFFICE
CERTIFICATE OF CORRECTION

PATENT NO. : 4,494,967

DATED : January 22, 1985

INVENTOR(S) : Peter Barth

It is certified that error appears in the above-identified patent and that said Letters Patent is hereby corrected as shown below:

Column 1 Line 30 "absorption" should read --adsorption--.

Column 3 Line 42 "in" should read --is--.

Column 6 Line 56 "articles" should read --particles--.

Column 6 Line 65 Delete --one--.

Column 7 Line 51 "plate" should read --phase--.

*Signed and Sealed this*

*Second* Day of *July 1985*

[SEAL]

Attest:

DONALD J. QUIGG

*Attesting Officer*     *Acting Commissioner of Patents and Trademarks*